3,391,136
3 - CHLORO - 11 - (γ - DIMETHYLAMINOPRO-
PYLIDENE) - 5,6 - DIHYDROMORPHANTHRI-
DINE AND DERIVATIVES
Alex Berg, Biberach an der Riss, Germany, assignor to
Boehringer Ingelheim G.m.b.H., Ingelheim am Rhein,
Germany, a corporation of Germany
No Drawing. Continuation-in-part of abandoned application Ser. No. 395,288, Sept. 9, 1964. This application Apr. 25, 1966, Ser. No. 544,702
Claims priority, application Germany, Sept. 13, 1963,
T 24,706, T 24,707
1 Claim. (Cl. 260—239)

ABSTRACT OF THE DISCLOSURE

Compounds of the formula

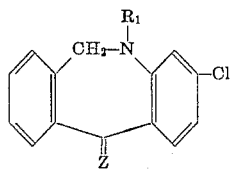

where $R_1$ is hydrogen or lower alkyl, and Z is substituted aminoalkylidene, or their acid addition or quaternary ammonium salts, have psychotropic, antiemetic, narcosis-potentiating, adrenolytic, antipyretic, hypothermic, spasmolytic, antitussive, anticholinergic, antiserotonin, antihistaminic, and sedative activities in warm blooded animals. Compounds where $R_1$ is hydrogen and Z is γ-dimethylaminopropylidene or N-methyl-4-piperidylidene are specifically exemplified.

---

This is a continuation-in-part of copending application Ser. No. 395,288, filed Sept. 9, 1964, now abandoned.

This invention relates to novel substitution products of 5,6-dihydromorphanthridine and acid addition salts thereof, as well as to various methods of preparing these compounds.

More particularly, the present invention relates to novel substitution products of 5,6-dihydromorphanthridine of the formula

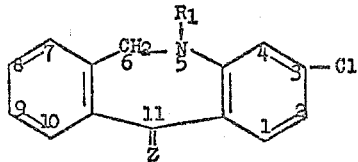

wherein
Z is selected from the group consisting of

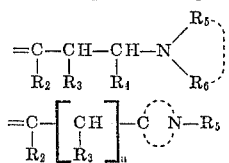

and

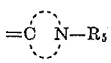

where
$R_2$, $R_3$, $R_4$ and $R_5$ are each selected from the group consisting of hydrogen and lower alkyl,

is a basic 5- to 7-membered saturated heterocycle, $n$ is an integer from 0 to 1, inclusive,
$R_6$ is lower alkyl, and
$R_5$ and $R_6$, together with each other and the adjacent nitrogen atom, form a basic 5- to 7-membered saturated heterocycle, and
$R_1$ is selected from the group consisting of hydrogen and lower alkyl, their non-toxic, pharmacologically acceptable acid addition salts and their non-toxic, pharmacologically acceptable quaternary ammonium salts.

The compounds according to the present invention may be prepared by a number of different methods of which the following is most convenient and efficient:

By reducing a compound of the formula

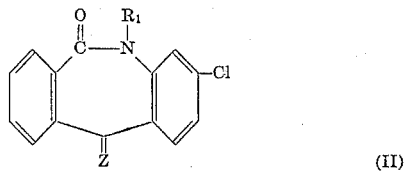

wherein $R_1$ and Z have the same meanings as in Formula I, with a complex metal hydride, preferably with lithium aluminum hydride, in an inert anhydrous solvent at moderately elevated temperatures and advantageously at the boiling point of the solvent. Examples of suitable anhydrous solvents are ether, tetrahydrofuran and dioxane. In the event that the starting compound is difficultly soluble in the particular solvent, it may be gradually extracted into the reaction vessel from a customary extraction apparatus, such as a Thielepape extractor.

The starting compounds II may be obtained by one of the following methods:

(a) By reacting a compound of the formula

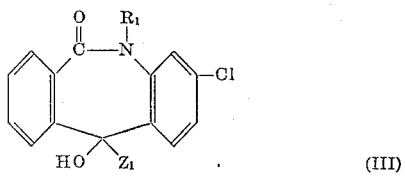

wherein $R_1$ has the same meaning as in Formula I, and
$Z_1$ is selected from the group consisting of

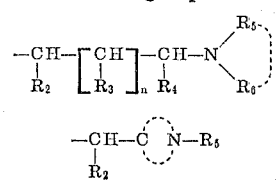

and

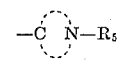

where
$R_2$, $R_3$, $R_4$ and $R_5$ are each selected from the group consisting of hydrogen and lower alkyl,
$R_6$ is lower alkyl,
$R_5$ and $R_6$, together with each other and the adjacent nitrogen atom, form a 5 to 7-membered basic saturated heterocyclic ring,
$n$ is an integer from 0 to 1, inclusive, and

is a 5- to 7-membered basic saturated heterocycle, with a dehydrating agent pursuant to known procedures.

Examples of suitable dehydrating agents are sulfuric acid, zinc chloride, phosphorus oxychloride and ethanolic hydrochloric acid, but the reaction is most preferably carried out with polyphosphoric acid at a temperature between 100 and 180° C. and in the presence of a high-boiling-point solvent, such as xylene, if necessary. Or (b) By reacting an oxime of the formula

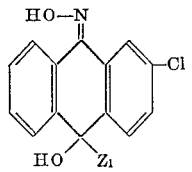

(IV)

wherein $Z_1$ is selected from the group consisting of

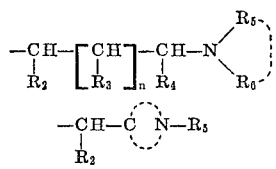

and

where $R_2$, $R_3$, $R_4$ and $R_5$ are each selected from the group consisting of hydrogen and lower alkyl, $R_6$ is lower alkyl, $R_5$ and $R_6$, together with each other and the adjacent nitrogen atom, form a 5- to 7-membered basic saturated heterocyclic ring, $n$ is an integer from 0 to 1, inclusive, and

is a 5- to 7-membered basic saturated heterocycle, with polyphosphoric acid, a polyphosphoric acid ester, aluminum chloride, sulfuric acid or an aromatic sulfuric acid ester at elevated temperatures, preferably at temperatures between 120 and 180° C., and in the presence of a high-boiling-point solvent, such as xylene, if necessary.

The end products of the Formula II which are obtained by method (a) and wherein $R_1$ is hydrogen, as well as the end products obtained by method (b) may, if desired, subsequently be transformed into compounds of the Formula II wherein $R_1$ is lower alkyl by alkylating them pursuant to known procedures, for example, with an alkyl halide in the presence of an alkaline condensation agent, such as an alkali metal amide, an alkali metal hydride or an alkyl-lithium, such as lithium methide.

The starting compounds for methods (a) and (b) may be obtained by known methods. For instance, a compound of the Formula III above may be prepared from the corresponding 5,6-dihydromorphanthridin-6-one by reacting the latter with an aminoalkyl-magnesium-halide in the presence of an anhydrous inert solvent, as described in J. Med. Pharm. Chem. 5, 1199–1206 (1962).

Similarly, an oxime of the Formula IV may be obtained by reacting anthraquinone with a Grignard reagent of the formula $$Hal—Mg—Z_1 \qquad (V)$$

wherein $Z_1$ has the same meaning as in Formula III and Hal is a halogen, and subsequently reacting the reaction product with hydroxylamine.

The free bases of the Formula I may be converted into their non-toxic, pharmacologically acceptable acid addition salts by customary methods, that is, by acidifying a solution of the free base in an inert solvent with the desired inorganic or organic acid, for instance. Examples of non-toxic, pharmacologically acceptable acid addition salts are those formed with hydrochloric acid, sulfuric acid, phosphoric acid, citric acid, nucleic acid, fumaric acid, maleic acid, tartaric acid, 8-chlorotheophylline and the like.

Similarly, the free bases of the Formula I may be converted into non-toxic, pharmacologically acceptable quaternary ammonium salts by reacting them under customary quaternizing conditions with a quaternizing agent, such as an alkyl halide, an aralkyl halide or dimethyl sulfate.

The following examples further illustrate the present invention and will enable others skilled in the art to understand it more completely. It should be understood, however, that the invention is not limited to the particular examples given below.

EXAMPLE 1

Preparation of 3-chloro-11-(γ-dimethylaminopropyl-idene)-5,6-dihydromorphanthridine A solution of 0.05 mol of 3-chloro-11-(γ-dimethylaminopropylidene)-5,6-dihydromorphanthridin - 6 - one, M.P. 161–164° C., in 100 cc. of absolute tetrahydrofuran was added dropwise over a period of thirty minutes to a suspension of 5.7 gm. of lithium aluminum hydride in 200 cc. of absolute tetrahydrofuran, and the resulting mixture was refluxed for four hours while stirring. Thereafter, the reaction solution was decomposed by adding 25 cc. of water dropwise while thoroughly cooling. The precipitated metal hydroxides were separated by vacuum filtration, the filter cake was extracted twice with 100 cc. portions of tetrahydrofuran, and the combined extract solutions were concentrated by evaporation. The residue was purified by distillation. 3-chloro-11 - (γ - dimethylaminopropylidene)-5,6-dihydromorphanthridine, B.P. 192–195° C. at 0.02 mm. Hg, of the formula

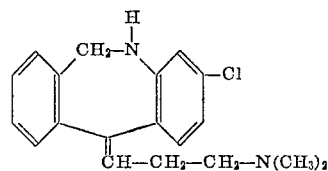

was obtained.

Its monomaleate, obtained by acidifying an ethereal solution of the free base with an ethereal solution of maleic acid and recrystallizing the product from acetone, had a melting point of 177–180° C.

EXAMPLE 2

Using a procedure analogous to that described in Example 1, 3-chloro-11-(N-methyl-4-piperidylidene)-5,6-dihydromorphanthridine, M.P. 184–185° C., of the formula

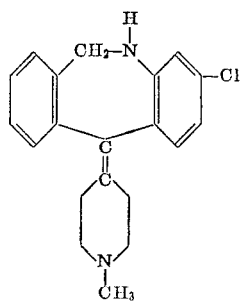

was prepared from 3-chloro-11-(N-methyl-4-piperidyl-idene)-5,6-dihydromorphanthridin-6-one (M.P. 183–186° C.). Its maleate had a melting point of 186–189° C. (decomposition).

The compounds according to the present invention, that is, those embraced by Formula I above and their non-toxic, pharmacologically acceptable acid addition and quaternary ammonium salts, have useful pharmacodynamic properties. More particularly, they exhibit psychotropic, antiemetic, narcosis-potentiating, adrenolytic, antipyretic, hypothermic, spasmolytic, antitussive, anticholinergic, antiserotonin and especially antihistaminic and sedative activities in warm-blooded animals.

For therapeutic purposes the compounds of the present invention are administered to warm-blooded animals topically, perorally or parenterally as active ingredients in customary dosage unit compositions consisting essentially of an inert carrier and one dosage unit of the active ingredient. Typical examples of such dosage unit compositions are hypodermic solutions, tablets, coated pills, ointments, lotions, jellies, dusting powders and the like. One dosage unit of the compounds according to the present invention is from 1 mgm. to 10 mgm. Compositions adapted for external, topical application should contain from 0.1 to 0.5%, preferably 0.2%, by weight of active ingredient, based on the total weight of the composition.

The following examples illustrate a few dosage unit compositions comprising a compound of the present invention as an active ingredient. The parts are parts by weight, unless otherwise specified.

EXAMPLE 3

Hypodermic solution

The solution is compounded from the following ingredients:

3-chloro-11-(N-methyl-4-piperidylidene)-5,6-dihydromorphanthridine _____parts__ 5.0
Distilled water _____parts by vol__ 3000.0

*Compounding procedure.*—The morphanthridine compound is dissolved in a sufficient amount of warm distilled water. After allowing the resulting solution to cool to room temperature, it is diluted to the required volume with additional distilled water. The solution is then filtered until free from suspended particles and is filled into brown 3 cc.-ampules in an atmosphere of nitrogen. The ampules are then sterilized for twenty minutes at 120° C. and finally sealed. Each ampule contains 5 mgm. of the active ingredient.

EXAMPLE 4

Tablets

The tablet composition is compounded from the following ingredients:

| | Parts |
|---|---|
| 3-chloro-11-(N-methyl-4-piperidylidene) - 5,6 - dihydromorphanthridine | 10.0 |
| Lactose | 84.0 |
| Cellulose, microcrystalline | 35.0 |
| Magnesium stearate | 1.0 |
| Total | 130.0 |

*Compounding procedure.*—Each of the ingredients is passed through a 0.75 mm.-mesh screen, and they are then intimately admixed with each other. The mixture is pressed into 130 mgm. tablets. Each tablet contains 10 mgm. of the active ingredient.

EXAMPLE 5

Coated pills

The tablets obtained pursuant to Example 4 are coated with a thin shell consisting essentially of talcum and sugar. The coated tablets are polished with beeswax. Each pill weighs approximately 200 mgm. and contains 10 mgm. of the active ingredient.

EXAMPLE 6

Lotion

The lotion is compounded from the following ingredients:

| | Parts |
|---|---|
| 3 - chloro - 11 - (N - methyl - 4 - piperidylidene)-5,6-dihydromorphanthridine | 0.2 |
| Sorbitan monopalmitate | 1.05 |
| Polyethyleneoxide derivatives of fats (cosmetic emulsifiers) | 1.95 |
| Mixture of cetyl and stearyl alcohols | 2.0 |
| Spermacetic | 1.0 |
| Mixture of high-molecular-weight alkanol esters of unsaturated fatty acids (mainly oleyloleate) | 5.0 |
| Paraffin oil | 1.0 |
| p-Hydroxybenzoic acid methyl ester | 0.1 |
| Distilled water | 87.7 |
| Total | 100.0 |

*Compounding procedure.*—A mixture of all of the ingredients except the morphanthridine compound and the hydroxybenzoic acid ester was heated to 70° C., whereby a melt was formed. An aqueous solution of the morphanthridine compound and the hydroxybenzoic acid ester at 70° C. is then emulsified into the warm melt, and the emulsion is allowed to cool slowly to room temperature while stirring. The finished lotion contains 0.2% by weight of the active ingredient.

EXAMPLE 7

Jelly

The jelly is compounded from the following ingredients:

| | Parts |
|---|---|
| 3 - chloro - 11 - (N - methyl - 4 - piperidylidene)-5,6-dihydromorphanthridine | 0.2 |
| Polyethyleneoxide derivatives of fats (cosmetic emulsifiers) | 28.0 |
| Glycerin | 5.0 |
| p-Hydroxybenzoic acid methyl ester | 0.1 |
| Distilled water | 66.7 |
| Total | 100.0 |

*Compounding procedure.*—The cosmetic emulsifiers at 85° C. are emulsified into a solution of the morphanthridine compound, the hydroxybenzoic acid ester and the glycerin in the distilled water at 85° C. The resulting emulsion is cooled to room temperature while stirring. The finished jelly contains 0.2% of the active ingredient.

EXAMPLE 8

Ointment

The ointment composition is compounded from the following ingredients:

| | Parts |
|---|---|
| 3 - chloro - 11 - (N - methyl - 4 - piperidylidene)-5,6-dihydromorphanthridine | 0.2 |
| Vaseline | 65.0 |
| Wool grease alcohols | 8.0 |
| Distilled water | 26.8 |
| Total | 100.0 |

*Compounding procedure.*—The distilled water at 70° C. is emulsified into a molten mixture of the Vaseline and the wool grease alcohols. The morphanthridine compound is then stirred into the emulsion at room temperature until it is uniform. The finished ointment is finally passed through a pair of pressure rollers. The ointment contains 0.2% by weight of the active ingredient.

EXAMPLE 9

Dusting powder

The powder is compounded from the following ingredients:

| | Parts |
|---|---|
| 3 - chloro - 11 - (N - methyl - 4 - piperidylidene)-5,6-dihydromorphanthridine | 0.2 |
| Talcum | 99.8 |
| Total | 100.0 |

*Compounding procedure.*—The morphanthridine compound is intimately admixed with the talcum, and the mixture is milled in a rod mill. The finished powder contains 0.2% by weight of the active ingredient.

Although the above dosage unit compositions illustrate only one compound of the class defined by Formula I as an active ingredient, it should be understood that any other member of the class or a non-toxic, pharmacologically acceptable acid addition or quaternary ammonium salt thereof may be substituted for the morphanthridine compound in Examples 3 through 9. Moreover, the quantity of active ingredient in these examples may be varied within dosage unit limits set forth above, and the nature and amount of the inert ingredients may be varied to meet particular requirements.

While the present invention has been illustrated with the aid of certain specific embodiments thereof, it will be readily apparent to others skilled in the art that the invention is not limited to those particular embodiments and that various changes and modifications may be made without departing from the spirit of the invention or the scope of the appended claim.

I claim:
1. 3 - chloro - 11 - ($\gamma$ - dimethylaminopropylidene)-5,6-dihydromorphanthridine; a non-toxic, pharmacologically acceptable acid addition salt thereof; or a non-toxic, pharmacologically acceptable quaternary ammonium salt thereof.

References Cited

UNITED STATES PATENTS 3,153,652  10/1964  Drukker et al. _____ 260—239

ALTON D. ROLLINS, *Primary Examiner.*